United States Patent
Ruymgaart et al.

(10) Patent No.: US 9,828,107 B1
(45) Date of Patent: Nov. 28, 2017

(54) REDUNDANT COMPONENT AND INTELLIGENT COMPUTERIZED CONTROL SYSTEM FOR MULTI-ROTOR VTOL AIRCRAFT

(71) Applicants: Arnold Peter Ruymgaart, Albuquerque, NM (US); Lydia Tapia, Albuquerque, NM (US); Aleksandra Faust, Palo Alto, CA (US); Rafael Fierro, Albuquerque, NM (US)

(72) Inventors: Arnold Peter Ruymgaart, Albuquerque, NM (US); Lydia Tapia, Albuquerque, NM (US); Aleksandra Faust, Palo Alto, CA (US); Rafael Fierro, Albuquerque, NM (US)

(73) Assignee: STC.UNM, Albuquerque, NM (US)

( * ) Notice: Subject to any disclaimer, the term of this patent is extended or adjusted under 35 U.S.C. 154(b) by 279 days.

(21) Appl. No.: 14/835,567

(22) Filed: Aug. 25, 2015

Related U.S. Application Data

(60) Provisional application No. 62/041,453, filed on Aug. 25, 2014.

(51) Int. Cl.
| | |
|---|---|
| *B64D 31/06* | (2006.01) |
| *B64C 29/00* | (2006.01) |
| *A62C 37/10* | (2006.01) |
| *B64B 1/06* | (2006.01) |
| *A62C 3/02* | (2006.01) |
| *B64B 1/00* | (2006.01) |

(Continued)

(52) U.S. Cl.
CPC ............. *B64D 31/06* (2013.01); *B64C 29/00* (2013.01); *A62C 3/02* (2013.01); *A62C 19/00* (2013.01); *A62C 37/10* (2013.01); *B64B 1/00* (2013.01); *B64B 1/06* (2013.01); *B64B 1/08* (2013.01); *B64B 1/10* (2013.01); *B64B 1/12* (2013.01); *B64B 1/34* (2013.01); *B64B 1/36* (2013.01); *B64C 13/00* (2013.01); *B64C 13/04* (2013.01); *B64C 13/20* (2013.01); *B64C 27/00* (2013.01); *B64C 27/20* (2013.01); *B64C 27/52* (2013.01); *B64C 29/0033* (2013.01); *G05D 1/04* (2013.01); *G05D 1/08* (2013.01); *G06F 7/00* (2013.01); *G06N 5/00* (2013.01)

(58) Field of Classification Search
CPC ...... B64D 45/001; B64D 31/06; B64C 13/20; B64C 29/0033; B64C 39/024; B64C 27/00; B64C 13/00; B64C 13/04; B64C 27/52; B64C 29/00; A62C 19/00; A62C 3/02; A62C 37/10; G06N 5/00; B64B 1/10; B64B 1/36; B64B 1/34; B64B 1/12; B64B 1/08; B64B 1/06; B64B 1/00; G05D 1/08; G05D 1/04; G06F 7/00
See application file for complete search history.

(56) References Cited

U.S. PATENT DOCUMENTS

| | | | |
|---|---|---|---|
| 2003/0093187 A1* | 5/2003 | Walker ................... | B64C 13/20 701/1 |
| 2004/0129833 A1* | 7/2004 | Perlo ...................... | B64C 27/20 244/70 |

(Continued)

*Primary Examiner* — Behrang Badii
(74) *Attorney, Agent, or Firm* — Keith A. Vogt; Vogt IP

(57) ABSTRACT

The present invention provides a vehicle with redundant systems to increase the overall safety of the vehicle. In other aspects, the present invention provides a method for learning control of non-linear motion systems through combined learning of state value and action-value functions.

20 Claims, 9 Drawing Sheets

(51) Int. Cl.
*B64C 13/00* (2006.01)
*B64B 1/34* (2006.01)
*B64B 1/08* (2006.01)
*A62C 19/00* (2006.01)
*G05D 1/04* (2006.01)
*B64C 27/52* (2006.01)
*G05D 1/08* (2006.01)
*B64C 27/20* (2006.01)
*B64B 1/10* (2006.01)
*B64B 1/12* (2006.01)
*B64C 27/00* (2006.01)
*B64C 13/04* (2006.01)
*B64C 13/20* (2006.01)
*G06F 7/00* (2006.01)
*B64B 1/36* (2006.01)
*G06N 5/00* (2006.01)

(56) References Cited

U.S. PATENT DOCUMENTS

| 2008/0179454 | A1* | 7/2008 | Balaskovic | B64B 1/06 244/30 |
| 2009/0120653 | A1* | 5/2009 | Thomas | A62C 3/02 169/61 |
| 2010/0286860 | A1* | 11/2010 | Rowe | G06N 5/00 701/31.4 |
| 2010/0320314 | A1* | 12/2010 | Balaskovic | B64B 1/34 244/96 |
| 2015/0197335 | A1* | 7/2015 | Dekel | B64C 29/0033 701/5 |

* cited by examiner

Eccentricity Manhattan

Axial Sum Complex Sum (a) Time to learn (b) Learning curve (logarithmic)

Quadrotor trajectory

Load trajectory

Robot trajectories

Load trajectory

REDUNDANT COMPONENT AND INTELLIGENT COMPUTERIZED CONTROL SYSTEM FOR MULTI-ROTOR VTOL AIRCRAFT

RELATED APPLICATIONS

This application claims the benefit of U.S. Provisional Application No. 62/041,453 filed Aug. 25, 2014 and herein incorporated by reference.

STATEMENT REGARDING FEDERALLY SPONSORED RESEARCH & DEVELOPMENT

Not applicable.

INCORPORATION BY REFERENCE OF MATERIAL SUBMITTED ON A COMPACT DISC

Not applicable.

BACKGROUND OF THE INVENTION

Electric multicopters (multirotors or MR-VTOL vehicles) are helicopters that use multiple rotors, typically four or more, to lift off the ground. The frame is as simple as a cross with a motor at each corner. The use of four or more rotors allows complete control of the craft with simple fixed pitch propellers. Control is accomplished by varying the individual rotation speeds of the motors. The only moving parts on the craft are the motors/props. This means multicopters are mechanically very simple unlike traditional helicopters that require cyclic and collective control on the main rotor and collective control on the tail rotor. However, the traditional helicopter does have an advantage: although mechanically more complex, it can be controlled completely by a human pilot without electronic assistance.

It is not humanly possible to control a multicopter of the type being described without gyroscopically modulated motor control. Only "fly by wire" is possible and the wire must have some control capability.

Despite the mechanical simplicity of the multicopter, it has only recently become attractive to popular use in the hobby and UAV markets. This is in part because gyroscopic control requires high precision computers with accurate gyro and accelerometer input. Only in the last few years have these components become affordable and readily available. One can easily buy a 3-axis electronic gyro board and build a simple hobby radio controlled quadcopter. However, currently available commercial and home-built machines come at a safety risk. A simple, common mechanical failure can result in complete system loss and catastrophe for multicopter cargo.

The agility and hardware simplicity of these vehicles also makes them ideal candidates for high-risk missions and in both open and compact spaces. MR-VTOL vehicles have been used in the movie industry for filming, search and rescue missions, and food transport. Future applications of MR-VTOL vehicles are virtually unlimited, e.g., human transport, exploration, and autonomous robotic delivery. From these numerous examples of transport, one common theme emerges, the cargo is often valuable and can be irreplaceable. This feature makes it critical that redundant safety features be incorporated into these transport devices to in order to increase their viability in the marketplace.

BRIEF SUMMARY OF THE INVENTION

In one embodiment, the present invention provides an affordable, smart, component-based MR-VTOL vehicle capable of safe transport of valuable cargo. The invention addresses major safety-related risks associated with the MR-VTOL such as engine failure, battery failure, and stability in severe weather in an effective manner. The resulting vehicle is fully functional and a solid basis for an affordable, safe, and redundant unmanned aerial vehicle (UAV). The embodiment can commercially be applied in existing markets such as surveillance, plant and dangerous area inspections, military operations and photography/cinematography. The embodiment will also incorporate the safety features required and not currently available for safe human transport and other high-consequence missions with a MR-VTOL vehicle.

In other aspects, the present invention addresses safety effectively through an embodiment that is a combination of self-contained smart units, Smart Propulsion Units (SPUs), with a centralized Artificial Intelligent Control Unit (AICU). The SPU is built with redundancies and contains smart controllers that autonomously load-balance its redundant components for optimally efficient performance under normal conditions. In fault conditions, the SPU internal controller autonomously decides on the best action to take with the internally available redundant components. This modular design offloads fault-handling tasks from the AICU leaving it free to handle global safety characteristics such as severe weather and smart unit failures. An added advantage of this distributed decision-making is that loss of any one smart unit or the central control does not necessarily compromise the safety of the whole and communication complexity between components is reduced. This reduces overall complexity and cost over centralized handling of all faults.

In yet other embodiments, the present invention provides a modular computer controlled redundant hardware organization for vertical take-off and landing (VTOL) multi-rotor aircraft. The present invention comprises "smart components" (e.g. SPU) that are capable of fault detection and decision making on their own while the whole is controlled by intelligent computerized control units (AICU1) capable of machine learning. These units are trained for possible (compound) component system failure events and corresponding change in flight characteristics. Every component needed for flight including basic flight controllers and the AICU itself (but not including components of the airframe) is at least dual redundant. Aircraft comprising a plurality of rotors may utilize the present invention.

In other embodiments, the present invention comprises SPUs, Redundant power sources (R Bat) and redundant AICUs. The two or more AICUs are connected to the redundant flight controllers, the smart propulsion units and all signal Input/Output. The SPUs address faults within themselves while the task of the AICU is to deal with all possible component failure or compound failure on a whole system scale. The AICU in control also decides on safest flight mode and flight envelope based on the situation. It outputs flight control commands to the Flight controller units and outputs positions of all switches in the redundant hardware setup that are outside of smart units. It uses machine learning to optimize flight control commands with altered flight characteristics due to component failure. The present invention is essentially the "Flight Engineer" of the craft although it also produces flight control input. The present invention provides safe transport of human beings by VTOL multi-copters without fixed wings while having safety standards similar to fixed wing aircraft.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

In the drawings, which are not necessarily drawn to scale, like numerals may describe substantially similar components throughout the several views. Like numerals having different letter suffixes may represent different instances of substantially similar components. The drawings illustrate generally, by way of example, but not by way of limitation, a detailed description of certain embodiments discussed in the present document.

DETAILED DESCRIPTION OF THE INVENTION

Figure 1:
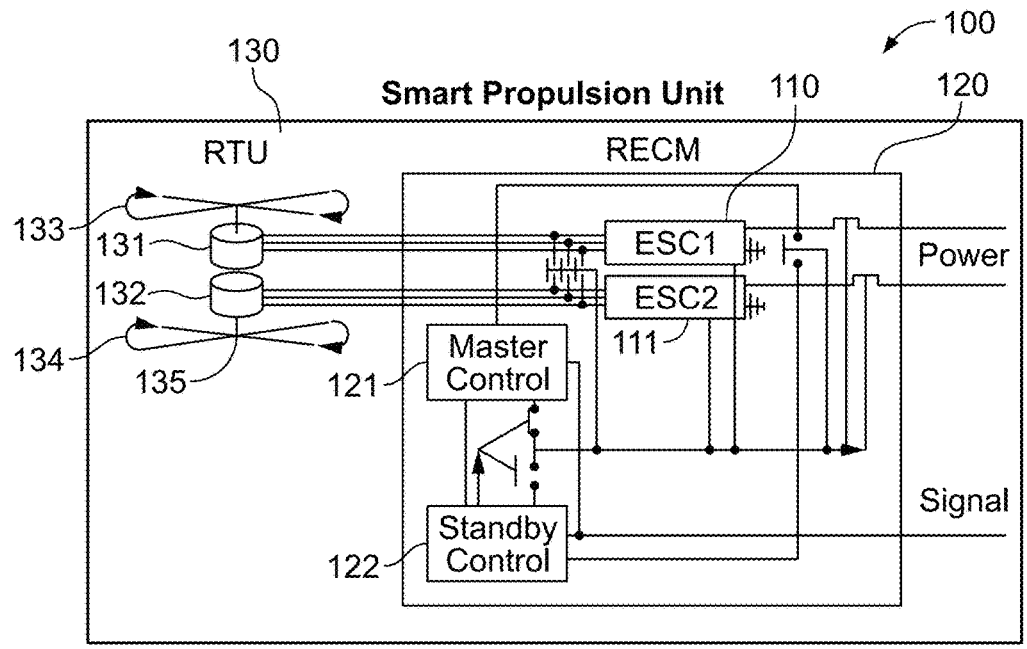
FIG. 1 illustrates a Smart Power Unit (SPU) of one embodiment of the present invention.

Detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a representative basis for teaching one skilled in the art to variously employ the present invention in virtually any appropriately detailed method, structure or system. Further, the terms and phrases used herein are not intended to be limiting, but rather to provide an understandable description of the invention.

The present invention starts with an analysis to identify the most severe risks associated with MR-VTOL transportation systems and the results are in Table 1.

TABLE 1

SMR-VTOL risk analysis for most significant risks. Occurrence frequency: low (1), medium (2), high (3), occurrence severity: unpleasant (1), damaging (2), and catastrophic (3), impact: acceptable (1-2), significant (3-5), critical (6-9), and Resolution

| Risk | Occurrence (1-3) | Severity (1-3) | Impact (1-9) | Resolution |
|---|---|---|---|---|
| Battery failure | 3 | 3 | 9 | SPU |
| Stability in extreme maneuvers/weather | 3 | 3 | 9 | AICU |
| Motor Control (ESC) failure | 2 | 3 | 6 | SPU |
| Engine or prop failure | 2 | 3 | 6 | Dual motor SPU |
| Collision avoidance | 3 | 3 | 9 | Navigation |

The risk's impact factor is product of occurrence and severity. In this embodiment, the present invention considered risks with an impact factor critical (higher than 6) as mandatory to address. Critical risk impact means either moderate or high chance of catastrophic event such as loss of life, bodily injury, and severe property damage, or very frequent events leading to small damages in hardware and leading to high-accumulated cost of ownership. The most significant risks are battery, motor speed control (Electronic Speed Controller, ESC, in particular ESC power stages) and engine failure, the ability to handle extreme maneuvers and weather, and collision avoidance. However, since collision avoidance is an artifact of the chosen navigation, for this embodiment, the focus of the present invention is on dealing with other critical risks.

In one embodiment, the present invention approaches safety from the perspective of individual functional units. The approach retains multicopter simplicity, which is an advantage over traditional UAVs. The embodiment uses smart functional units with internal decision. The functional units are configured to make relatively simple decisions based on internal fault detection and operational efficiency. This makes their development complexity and requirement for processing capacity relatively low. And, since the units can make their own local decisions, there is also significantly less complexity for the central machine learning processor and fewer requirements for communication in the system. In addition, loss of a smart unit does not affect other units and even the loss of the central AICU still retains the smart unit safety features.

As shown in FIG. 1, one functional unit provided by the present invention is smart power unit 100 (SPU). SPU 100 contains one or more electronic speed controllers 110 and 111 (ESC). In a preferred embodiment, the output of each ESC is three phase electric to motor with the inputs being the control signal and battery power. The ESC may be comprised of a microprocessor and a set of three half bridges, with a half bridge assigned to each phase of the motor. In other embodiments, the present invention assigns redundant half bridges to each phase of the motor. In yet other embodiments, the present invention monitors each half bridge and is adapted to isolate a failed half bridge and replace it with a backup half bridge.

In yet other embodiments, to address the failure of a half-bridge, also called a power stages, the present invention provides a three phase brush-less DC (BLDC) motor controller consisting of a microprocessor, three half bridges (one for each phase) and half-bridge driver circuitry. Each half bridge consists of two power transistors that rapidly switch on and off in a timed pattern to power a phase of the motor. Each of the three motor coils is always connected to two half bridges and two coils are powered at one time in a sequential pattern to produce rotation. During this switching action, the power transistors generate significant heat. The half bridge power transistors are therefore typically mounted on a heat sink. Overheat and over current can cause power transistor failure. Failure mode typically results in an electrical short that can, in turn, cause other transistors in the same BLDC circuit to fail.

It is possible to run two completely separate BLDC motor controllers at the same time, powering the same motor simultaneously, as long as they are synchronized in phase: they must generate the same electrical pulses at the same time. There must also be a rapid switching mechanism that disconnects a failing BLDC from the circuitry rapidly before it negatively affects the other one.

An alternative to the above is a redundant half bridge BLDC controller. In this case, the same microprocessor is used to time the switching and each motor phase has not one but two half bridges that are normally both active. The microprocessor must have failure detection circuitry and electrically isolate a failing half-bridge or isolate a single failing transistor within a half bridge. The motor can continue to run on the remaining transistors.

As is also shown, the SPU consists of a redundant thrust unit 130 (RTU) attached to a redundant engine control module 120 (RECM). The RTU consists of 2 motors 131 and 132 each completely independent of the other and with its own propeller 133 and 134. The motors are mounted opposing each other vertically or facing the same direction so that the motors are stacked on the same axis 135 and produce thrust and rotation in the same direction. Attached to the RTU is RECM 120.

RECM 120 is the "smart" part of SPU 100. It contains two microprocessors that sense the state of the SPU and decides on switch positions within the SPU. In an electric version, the RECM contains two separate electronic speed controllers such as ECU 110 and ECU 111. The 3-phase output of each speed controller leads to one of the two concentric motors 131 and 132 of the RTU 130. There is a normally open switch that inter-connects each of the three leads of the 3-phase output. If one of the speed controllers fails, this switch can be closed and the remaining speed controller powers both motors. The power input lines (from power source) are also completely separate (or at least + with −frame) from source to RECM and connect into one of the two speed controllers. There are normally closed switches on each of the power input lines and a normally open switch between the two power input lines. The RECM unit is self-contained and controlled by one of its two microprocessors 121 and 122, which may be arranged in a master/slave relationship, that sense the state of each ESC, each power input line and electric motor by a set of current and voltage sensors. The microprocessors decide on the position of the switches.

The present invention, in other embodiments, provides a signal line that is bi-directional, ESC input and RECM microprocessor state (of the unit) output. The SPU may function without input from a main AICU with the exception of the ESC motor speed signal. It does provide output to central AI units. The microprocessor in charge (not shown) controls the switches within the SPU as needed to deal with faults. The microprocessor in charge also detects short or power loss on the input lines and isolates or joins the lines as needed. The join switch (normally open) is only closed upon isolation of one of the power input lines. The standby microprocessor (not shown) takes over if a signal is lost from the master processor and otherwise is identical.

The SPU may also function independent of main AI control and deals with faults within its own unit. The microprocessor in control within the SPU oversees the status of the internal components and opens and closes switches as needed to deal with internal system failures.

In yet other embodiments, each SPU has dual critical sources: power and signal input and dual critical internal components. The SPU performs decision-making based on internal monitoring of voltages, currents and power stage temperatures. It can completely isolate one of the redundant power sources and switch to the other. During normal operation, it can alternate use of both power stages to minimize temperature and maximize efficiency. In further embodiments, a dual motor SPU is essentially two of the above sharing the redundant inputs and with motors mounted on a concentric axis.

Figure 2:
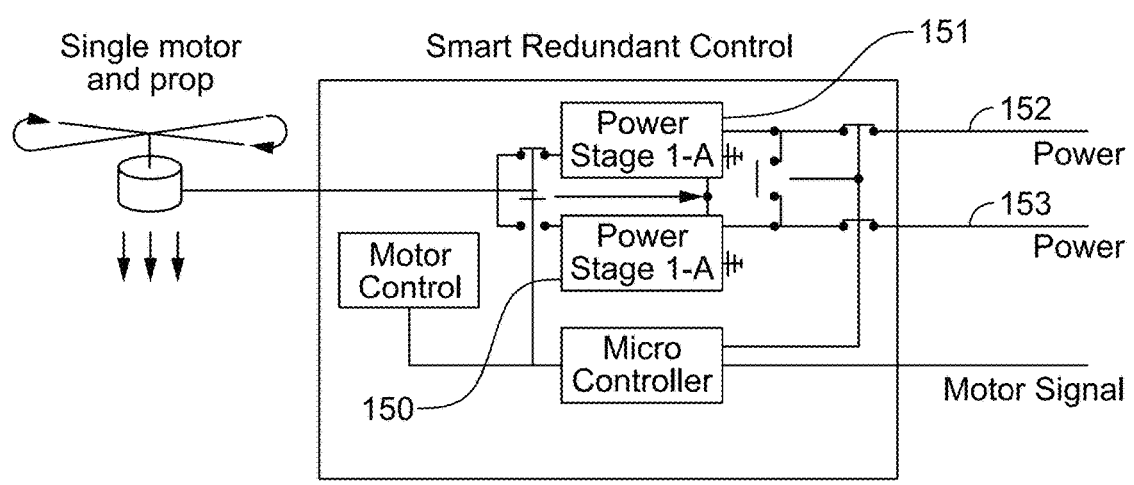
FIG. 2 illustrates a redundant power system of one embodiment of the present invention with power redundancy.

In still further embodiments, the present invention provides power source redundancy from the battery source to each motor through the introduction of redundant motor control power stages as shown in FIG. 2. The design requires that each has two critical inputs (power and motor control signal) and internally has at least two power stages 150 and 151 for each input power source 152 and 153. The unit monitor power and signal sources and motor control power stages. The unit internally and autonomously selects a source or power stage and isolates a faulty or shorting input or power stage. Under normal conditions, the unit switches between power stages to minimize heat dissipation and maximize efficiency. In the case of dual motors, the unit decides the distribution of power between the two. For example, if one motor fails, it can power up the other. All this is without need for any communication with a central controller. This distributes the fault control problem over components. In addition to taking action when a fault occurs, component health is constantly monitored and can be logged. This health monitoring allows prevention of failures altogether by reporting unusual component behavior before failure occurs.

While SPUs are responsible for managing the inner workings and reducing failure risk of motor controllers, propellers and power sources, thus significantly reducing the risk of motor controller failure in the various embodiments of the present invention, the vehicle is still susceptible to damage due to severe weather, overly aggressive maneuvers, battery failure, or unlikely simultaneous failure of more than one SPU. These failures are referred to as systematic failures, because they affect the whole system. To address them, the present invention provides an embodiment that uses an artificially intelligent control unit (AICU). This is the "main brain" capable of machine learning of the present invention as described in greater detail below.

In one embodiment, the AICU is a control module between the operator and the SPU. The UAV operator, e.g., human or autonomous piloting agent, interfaces with the AICU by providing the direction and speed of the desired flight. The AICU produces the feasible motor controls for SPUs that take into account the current state-of-health of the system. It does this task by first being trained under normal flying conditions, in order to build an internal nominal model. During flight, the module takes the measurements of the actual flight data performance and compares them to the expected data from the nominal model. The current state of flight is then updated and the discrepancy is assessed. These discrepancies could come from weather conditions, an inexperienced pilot, or a systematic failure. When the AICU only recognizes the disruption from normal flight, the AICU performs decision making to alter flight control. Depending on the disturbance pattern, it can decide to perform an emergency landing or load balance the SPUs and resume normal flight. For example, a multicopter carrying a heavy payload could have a partially failing SPU. The flight controller would then power down the opposite SPU in order to maintain stability resulting in insufficient lift to hover. Through learning, the central control in charge of the flight controller would initiate a controlled descent to land to maintain the integrity of the UAV and the load.

Figure 3:
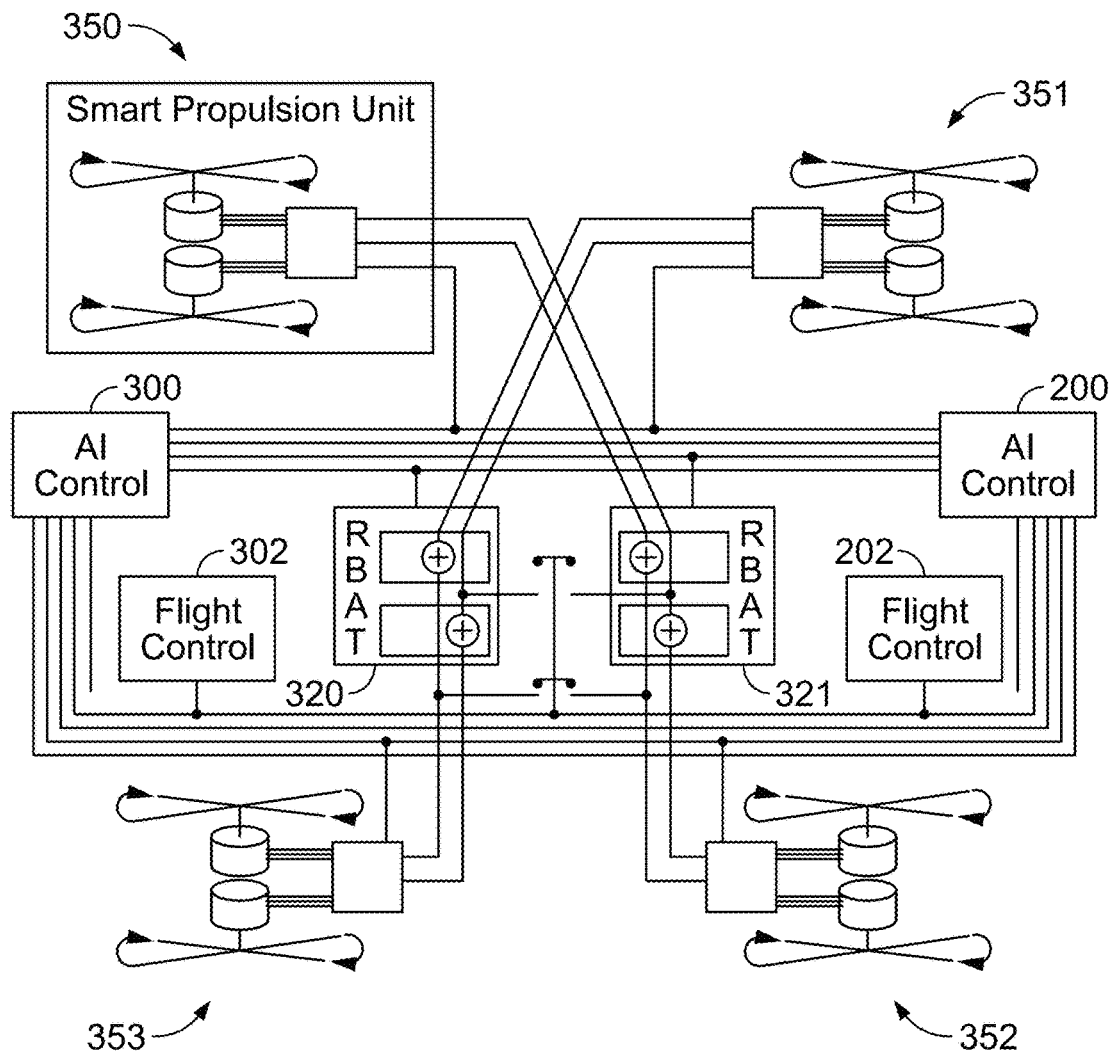
FIG. 3 illustrates an overall component layout of one embodiment of the present invention.
Figure 4:
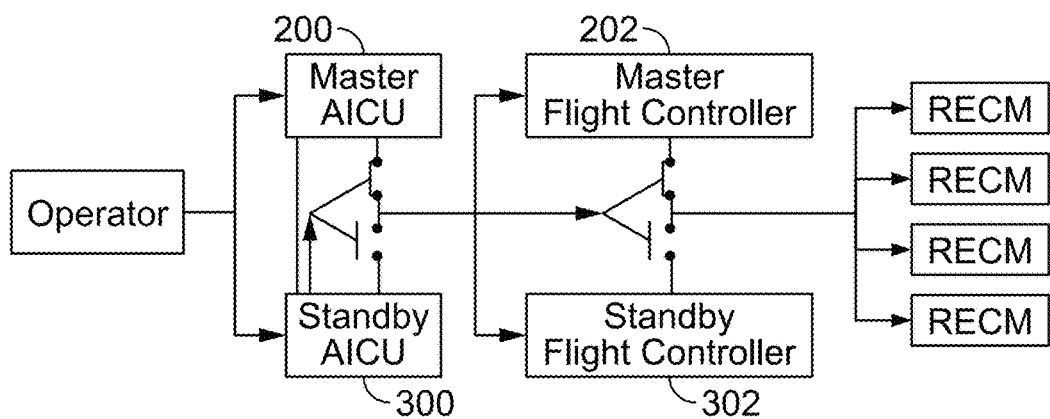
FIG. 4 illustrates a flow control for one embodiment of the present invention.

In yet another embodiment, as shown in FIGS. 3 and 4, the present invention provides at least 2 AICUs 200 and 300. This unit is a redundant system, which may arrange the units in a master-slave setup (there are 2; one is master 200, the slave 300 only monitors unless signal is lost from the master 200.) Each AICU control receives inputs from two separate flight control boards 202 and 302 and monitors the 4 engine output signals (PWM to ESC) and gyro information. It also receives state input from SPUs 350-353. Each AICU may be configured to directly control all switches on a whole system level outside of the smart components (in an alternate embodiment, the R-BAT modules 320 and 321 comprise smart components). Each AICU may also be configured to control outputs such as flight commands and flight mode commands to the Flight controllers and limits control inputs based on a desired safe flight envelope.

In other aspects, the present invention provides embodiments that address the following component failures and compound failures (list may not be complete) as follows:

Engine failure: For a quad-rotor design, with 8 total engines, the craft is capable of controlled flight on as little as two motors as long as they oppose each other (on opposite sides of the frame). Loss of any single motor has minimal effect on flight as the other motor in the RTU can be powered up to compensate. Loss of two motors, three motors and four motors also have minimal impact on flight as long as each failure is on a different RTU. The AICU is trained to compensate flight control input and limits for the difference in flight characteristic with one or more motor failure(s).

Loss of an entire SPU (RTU or RECM or both): With the loss of an entire SPU, the craft can remain in controlled flight. The opposing RTU is either powered down completely (requiring rotational flight mode capability of the flight controller). The opposing unit provides slight up/down thrust to aid in maintaining vertical/horizontal stability.

Loss of two entire SPU's (RTU or RECM or both): The craft remains in controlled flight as long as the failed RTUs are on opposing sides of each other on the frame. If two adjacent RTUs fail, controlled flight may no longer be possible.

Speed controller failure (within smart propulsion unit): In most cases there is no overall effect on flight since the other speed controller in the RECM powers both motors in the RTU it controls. The SPU deals with ESC failure itself.

Compound motor and ESC failure in the same SPU: If motor 1 fails along with ESC 1, no action needs to be taken. However, if motor 1 fails along with ESC 2, the switch that connects the 3-phase power output is closed and the bad ESC input power line switch is opened. These actions are taken by the microprocessor within the SPU of the present invention.

Prop failure: Similar to motor failure.

Loss of a main battery: There are two separate main redundant batteries 320 and 321 (R Bat), in turn each consisting of two separate batteries. In normal mode, each main R-bat provides two independent power output leads from its independent internal batteries. Within each RECM there is a normally open switch that is closed to connect the two leads. One additional central switch (normally open) interconnects the separate R Bat units. The effect of closing the interconnect switches in the RECMs and the central switch unifies the entire electrical system.

Electrical shorts: The completely redundant layout of the present invention along with switching capability in the RECMs and in/between R-Bats allows isolation of circuits a re-powering from different source.

Flight control gyro failure: Erratic flight controller output results in switching to the other flight controller board.

Flight control motor speed signal output failure: Flight controller output to each of the RECMs is monitored as well. In case of a loss of signal, the AICU switches to use the other flight controller board.

Battery Fire: The present invention comprises the ability to drop one of the R-Bat battery units from the airframe.

Any failure can be compounded with other failures. The AICUs of the present invention are configured to address every possible scenario.

In still further embodiments, the present invention provides machine-learning techniques for use in the above-described systems such as the AICU. All classical methods for solving non-linear control problems require knowledge of the system dynamics. On the other hand, the present invention provides a solution to an optimal non-linear control problem when the system dynamics is unknown.

Reinforcement learning (RL) solves control of unknown or intractable dynamics by learning from experience and observations. The outcome of the RL is a control policy. Typically the RL learns the value (cost) function and derives a greedy control policy with respect to the value. In continuous spaces, the value function is approximated. When actions are continuous, the greedy policy must be approximated as well. The downside of RL is that its sampling nature renders stability and convergence proofs challenging.

The present invention, in some embodiments, relies on RL, to learn control policy for constraint-balancing tasks without knowing the dynamic of the robot or vehicle. Given the continuous state space, fitted value iteration (FVI) approximates a value function with a linear map of basis functions. FVI learns the linear map parametrization iteratively in an expectation-maximization manner. The basis function selection presents challenges because the learning convergence is sensitive to the selection of the approximation functional space. Here, the present invention selects the basis functions to both fit the task and define value function as a Lyapunov candidate function.

In one embodiment, the present invention extends FVI, a discrete action RL algorithm, to continuous action space to develop continuous action fitted value iteration (CAFVI). This is a joint work with two value functions, state-value and action-value, to learn the control. CAFVI learns, globally to the state space, state-value function, which is negative of the Lyapunov. On the other hand, in the estimation step, it learns an action-value function locally around a state to estimate its maximum. This maximum is found using the policies that developed that divide-and-conquer the problem by finding the optimal inputs on each axis separately and then combine them.

Not only are the policies computationally efficient, scaling linearly with the input's dimensionality, but they produce consistent near-optimal input; their outcome does not depend on the input samples used for calculation. Although problem decomposition via individual dimensions is a common technique for dimensionality reduction, the present invention shows that single-component policies lead to a stable system.

From the practical perspective, the present invention provides methods to implement an FVI with linear map approximation for a constraint-balancing task, on control-affine systems with unknown dynamics and in presence of a bounded drift. These tasks require the system to reach a goal state, while minimizing opposing constraints along the trajectory.

To develop the above-described method, the present invention first specifies the problem formulation for a task on a control-affine system suitable for approximate value iteration with linear basis vectors. Consider a discrete time, control-affine system with no disturbances, $D: X \times U \to X$, $$D: x_{k+1} = f(x_k) + g(x_k)u_k. \tag{1}$$

where states are $x_k \in X \subseteq R^{d_x}$, input is defined on a closed interval around origin, $u_k \in U \subset R^{d_u}$, $d_u \leq d_x$, $0 \in U$, and $g: X \to R^{d_x} \times R^{d_u}$, $g(x_k)^T = [g_1(x_k) \ldots g_{d_u}(x_k)]$ is regular for $x_k \in X \setminus \{0\}$, nonlinear, and Lipchitz continuous. Drift $f: X \to R^{d_x}$, is nonlinear, and Lipschitz. Assume that the system is controllable with a goal of autonomously finding control input $u_k$ that takes the system to its origin in a timely-manner while reducing $\|Ax\|$ along the trajectory, where $A^T = [a_1, \ldots, a_{d_g}] \in R^{d_g} \times R^{d_x}$, $d_g \leq d_x$ is nonsigular.

A discrete time, deterministic first-order Markov decision process (MDP) with continuous state and action spaces, $$M:(X, U, D, \rho) \tag{2}$$

defines the problem. $\rho: X \to R$ is the observed state reward, and the system dynamics $D$ is given in (1). It is assumed that there is access to its generative model or samples, but that we do not know $D$. When the time step $k$ is not important, it is dropped from the state notation without the loss of generality.

A solution to MDP is an optimal policy $h^*: X \to U$, that maximizes discounted cumulative state reward. Thus, the objective function to maximize, state-value cost function $V: X \to R$, is $$V(x) = \sum_{k=0}^{\infty} \gamma^k \rho_k, \tag{3}$$

where $\rho_k$ is immediate reward observed at time step $k$ starting at state $x$, and $0 \leq \gamma < 1$ a discount constant. RL solves MDP without analytical knowledge of the system dynamics $D$, and reward, $\rho$. Instead, it interacts with the system and iteratively constructs the value function. Using the Bellman equation, the state value function $V$ can be recursively represented as $V(x) = \rho(x) + \gamma \max V(D(x,u))$. The state value function is an immediate state reward plus discounted value of the state the system transitions following greedy policy. The action-state function $Q: X \times U \to R$, $Q(x,u) = \rho(x') + \gamma \max V(D(x', u'))$, and $x' = D(x,u)$.

Action-value function, $Q$, is the sum of the reward obtained upon performing action $u$ from a state $x$ and the value of the state that follows. Both value functions give an estimate of a value. A state-value function, $V$, is a measure of state's value, while an action-value function, $Q$, assigns a value to a transition from a given state using an input. Note, that RL literature works with either a state-reward $\rho$, or a related state-action reward where the reward is a function of both the state and the action. We do not consider a cost of action itself, thus the state-action reward is simply the reward of the state that the agent transitions upon applying action $u$ in the state $x$. Therefore, the relation between the $V$ and $Q$ is $$Q(x,u) = V \cdot D(x,u). \tag{4}$$

Both value functions devise a greedy policy $h: X \to U$, at state $x$, as the input that transitions the system to the highest valued reachable state.

$$h^Q(x) = \underset{u \in U}{\mathrm{argmax}} Q(x, u) \tag{5}$$

A greedy policy uses the learned value function to produce trajectories. We learn state-value function, $V$, because its approximation can be constructed to define a Lyapunov candidate function, and in tandem with the right policy it can help assess system stability. For discrete actions MDPs, (5) is a brute force search over the available samples. When action space is continuous, (5) becomes an optimization problem over unknown function $D$. The present invention considers analytical properties of $Q(x,u)$ for a fixed state $x$ and knowing $V$, but having only knowledge of the structure of the transition function $D$. The key insight used by the present invention is that existence of a maximum of the action-value function $Q(x,u)$, as a function of input $u$, depends only on the learned parametrization of the state-value function $V$.

Approximate value iteration algorithms with linear map approximators require basis vectors. Given the state constraint minimization, quadratic basis functions were selected $$F_i(x) = \|a_i^T x\|^2, \quad i = 1, \ldots, d_g. \tag{6}$$

so that state-value function approximation, $V$, is a Lyapunov candidate function. Consequently, $V$ is, $$V(x) = \sum_{i=1}^{d_g} \theta_i F_i(x) = (Ax)^T \Theta(Ax) = x^T \Lambda x \tag{7}$$

for a diagonal matrix $\Theta = \mathrm{diag}(\theta_1, \theta_2, \ldots, \theta_{d_g})$, and a symmetric matrix $\Lambda$. Let's assume that $\Lambda$ has full rank. Approximate value iteration learns the parametrization $\Theta$ using a linear regression. Let $\Gamma = -\Lambda$. Note, that if $\Theta$ is negative definite, $\Lambda$ is as well, while $\Gamma$ is positive definite, and vice versa. Let also assume that when $\Gamma > 0$ the system drift is bounded with x with respect to $\Gamma$-norm, $f(x)^T \Gamma f(x) \leq x^T \Gamma x$. This characterizes system drift, conductive to the task which is sufficient for use with robotic systems.

The system is controllable and the equilibrium is reachable. In particular, we use, $$\exists i,\ 1 \leq i \leq d_u,\ \text{such that } f(x) \Gamma g_i(x) \neq 0, \quad (8)$$

and that $g(x)$ is regular outside of the origin, $$g(x)^T \Gamma g(x) > 0,\ x \in X \setminus \{0\} \quad (9)$$

Input is defined on a closed interval around origin, $$0 \in U \quad (10)$$

The drift is bounded, $$f(x)^T \Gamma f(x) \leq x^T \Gamma x,\ \text{when } \Gamma > 0 \quad (11)$$

SUMMARY OF KEY SYMBOLS AND NOTATION.

| Symbol | Description |
| --- | --- |
| M: (X, U, D, p) | MDP |
| V: X → $\mathbb{R}$, V(x) = $x^T \Lambda x$ | State-value function |
| Q: X × U → $\mathbb{R}$ | Action-value function |
| Ax | Constraints to minimize |
| $\Lambda = A^T \Theta A$ | Combination of task constraints and value function parametrization |
| $\Gamma = -\Lambda$ | Task-learning matrix |
| $\Delta Q(x, \hat{u})$ | Policy $\hat{h}^Q$ in state x |
| $e_n$ | $n^{th}$ axis unit vector |
| $u \in U$ | Input vector |
| $u \in \mathbb{R}$ | Univariate input variable |
| $u_n \in \mathbb{R}$ | Set of vectors in direction of $n^{th}$ axis |
| $\hat{u}_n \in \mathbb{R}$ | Estimate in direction of the $n^{th}$ axis |
| $\hat{u}_n = \Sigma_{i=1}^{n} \hat{u}_n e_i$ | Estimate over first n axes |
| $\hat{u}$ | Estimate of Q's maximum with a policy |
| $Q_{x,n}^{(p)}(u) = Q(x, p + u e_n)$ | Univariate function in the direction of axis $e_n$, passing through point p |

Figure 5:
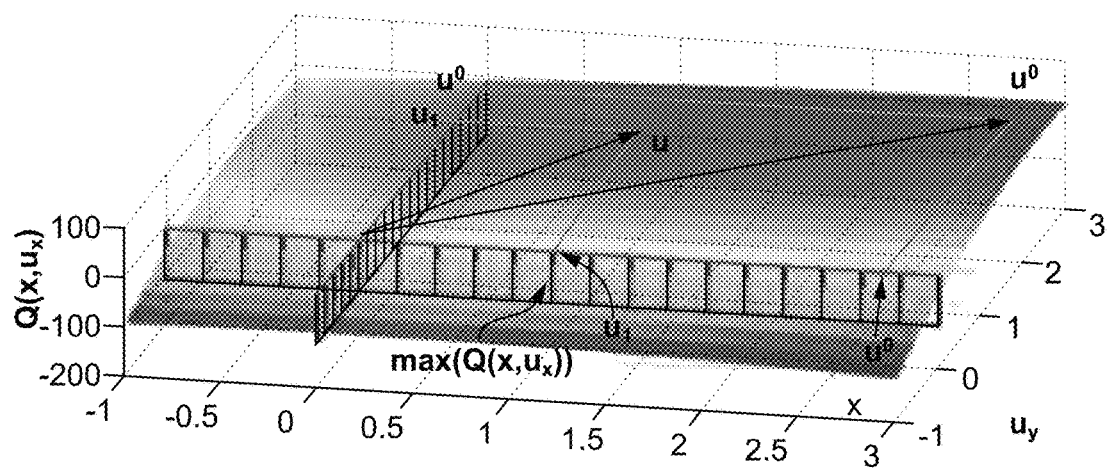
FIG. 5 illustrates an example of two-dimensional input and a quadratic value function used in accordance with an embodiment of the present invention. u* is the optimal input, u is the one selected.

This present invention also looks into an efficient and a consistent policy approximation for (5) that leads the system (1) to a goal state in the origin. Here, we learn the action-value function Q on the axes, and assume a known estimate of the state-value function approximation V. For the policy to lead the system to the origin from an arbitrary state, the origin must be asymptotically stable. Negative of the state-value function V can be a Lyapunov function, and the value function V needs to be increasing in time. That only holds true when the policy approximation makes an improvement, i.e., the policy needs to transition the system to a state of a higher value ($V(x_{n+1}) > V(x_n)$). To ensure the temporal increase of V, the idea is to formulate conditions on the system dynamics and value function V, for which Q, considered as a function only of the input, is concave and has a maximum. In this embodiment, we limit the conditions to a quadratic form Q. When we establish maximum's existence, we approximate it by finding a maximum on the axes and combining them together. FIG. 5 illustrates this idea. To reduce the dimensionality of the optimization problem, we propose a divide and conquer approach. Instead of solving one multivariate optimization, we solve $d_u$ univariate optimizations on the axes to find a highest valued point on each axis, $u_i$. The composition of the axes' action selections is the selection vector $u = [u_1 \ldots u_{d_u}]^T$.

This the policy approximation section may be developed following these steps: 1) show that Q is a quadratic form and has a maximum (Proposition III.1) 2) define admissible policies that ensure the equilibrium's asymptotic stability (Theorem III.2), and 3) find a sampling-based method for calculating consistent, admissible policies in $O(d_u)$ time with no knowledge of the dynamics (Theorem III.4).

Since the greedy policy (5) depends on action-value Q, Proposition III.1 gives the connection between value function (7) and corresponding action-value function Q.

Proposition III.1.

Action-value function Q(x,u) (4), of MDP (2) with state-value function V(7), is a quadratic function of input u for all states $x \in X$ When $\Theta$ is negative definite, the action-value function Q is concave and has a maximum.

Proof. Evaluating Q(x,u) for an arbitrary state x, we get $$Q(x,u) = V(D(x,u)) = (f(x)+g(x)u),\ \text{from } (1) = (f(x)+g(x)u)^T \Lambda (f(x)+g(x)u)$$

Thus, Q is a quadratic function of action u at any state x. To show that Q has a maximum, we inspect Q's Hessian, $$HQ(x, u) = \begin{bmatrix} \dfrac{\partial^2 Q(x, u)}{\partial u_1 \partial u_1} & \cdots & \dfrac{\partial^2 Q(x, u)}{\partial u_1 \partial u_{d_u}} \\ & \cdots & \\ \dfrac{\partial^2 Q(x, u)}{\partial u_{d_u} \partial u_1} & \cdots & \dfrac{\partial^2 Q(x, u)}{\partial u_{d_u} \partial u_{d_u}} \end{bmatrix} = 2 g(x)^T \Lambda g(x).$$

The Hessian is negative definite because $g(x)$ is regular for all states x and $\Theta < 0$, which means that $\Lambda < 0$ as well. Therefore, the function is concave, with a maximum. The state-value parametrization $\Theta$ is fixed for the entire state space. Thus, Proposition III.1 guarantees that when the parametrization $\Theta$ is negative definite; the action-value function Q has a single maximum. Next, we show that the right policy can ensure the progression to the goal, but we first define the acceptable policies.

Definition Policy approximation $\hat{u} = \hat{h}^Q(x)$ is admissible, if it transitions the system to a state with a higher value when one exists, i.e., when the following holds for policy's gain at state x, $\Delta Q(x, \hat{u}) = Q(x, \hat{u}) - V(x)$: 1) $\Delta Q(x, \hat{u}) > 0$, for $x \in X \setminus \{0\}$, and 2) $\Delta Q(x, \hat{u}) = 0$, for $x = 0$.

Theorem III.2 shows that an admissible policy is sufficient for the system to reach the goal. Theorem III.2. Let $\hat{u} = \hat{h}^Q(x)$ be an admissible policy approximation. When $\Lambda < 0$, and the drift is bounded with (11), the system (1) with value function (7) progresses to an asymptotically stable equilibrium under policy J.

Proof. Consider $W(x) = -V(x) = x^T \Gamma x$. W is a Lyapunov candidate function because $\Gamma > 0$.

To show the asymptotic stability, a W needs to be monotonically decreasing in time $W(x_{n+1}) \leq W(x_n)$ with equality holding only when the system is in the equilibrium, $x_n = 0$. Directly from the definition of the admissible policy, for the state $x_n \neq 0$, $W(x_{n+1}) - W(x_n) = -Q(x_n, \hat{h}^Q(x_n)) + V(x_n) = V(x_n) - Q(x_n, \hat{u}) < 0$ When $x_n = 0$, $\Rightarrow x_{n+1} = f(0) = 0$, because of $(11) \Rightarrow W(x_{n+1}) = 0$.

Theorem III.2 gives the problem formulation conditions for the system to transition to the goal state. Now, we move to finding sample-based admissible policies by finding maximums of Q in the direction parallel to an axis and passing through a point. Because Q has quadratic form, its restriction to a line is a quadratic function of one variable.

We use Lagrange interpolation to find the coefficients of Q on a line, and find the maximum in the closed form. We first introduce the notation for Q's restriction in an axial direction, and its samples along the direction.

Definition Axial restriction of Q passing through point p, is a univariate function $$Q_{x,i}^{(p)}(u) = Q(x, p \Gamma + u e_i).$$

If $q_i=[Q_{x,1}{}^P(u_{i1})\ Q_{x,2}{}^P(u_{i2})\ Q_{x,3}{}^P(u_{i3})]^T$, are three samples of $Q_{x,i}{}^{(p)}(u)$ obtained at points $[u_{i1}\ u_{i2}\ u_{i3}]$, then $Q(x,p+ue_i)$, is maximized at $$\hat{u}_i = \min(\max(\hat{u}^*_i, u_i^l), u_i^u), \text{ where} \quad (12)$$

$$\hat{u}^*_i = \frac{q_i^T \cdot ([u_{i2}^2\ u_{i3}^2\ u_{i1}^2] - [u_{i3}^2\ u_{i1}^2\ u_{i2}^2])^T}{2q_i^T \cdot ([u_{i2}\ u_{i3}\ u_{i1}] - [u_{i3}\ u_{i1}\ u_{i2}])^T},$$

on the interval, $d_i^l \leq u \leq u^u_i$. Equation (12) comes directly polynomial to find the coefficients of the quadratic function, and then equating the derivative to zero to find its maximum. In the stochastic case, instead of Lagrange interpolation, linear regression yields the coefficients.

A motivation for this approach is that maximum finding in a single direction is computationally efficient and consistent. A single-component policy is calculated in constant time. In addition, the input selection on an axis calculated with (12) is consistent, i.e. it does not depend on the sample points uij available to calculate it. This is direct consequence of quadratic function being uniquely determined with arbitrary three points. It means that a policy based on (12) produces the same result regardless of the input samples used, which is important in practice where samples are often hard to obtain.

Lemma III.3 shows single component policy characteristics including that a single-component policy is stable on an interval around zero. A single input policy approximation (12), for an input component, i, $1 \leq i \leq d_u$ has the following characteristics:

1) There is an input around zero that does not de-crease system's state value upon transition, i.e., $\exists u_0 \in [u_l^i, u_u^i]$ such that $Q_{x,i}{}^{(p)}(u) \geq Q(x,p)$.
2) $Q_{x,i}{}^{(0)}(\hat{u}_i) - V(x) \geq 0$, when $x \neq 0$
3) $Q(0, \hat{u}_i e_i) - V(0) = 0$ Three consistent and admissible policies are provided as examples. First, the Manhattan policy finds a point that maximizes Q's restriction on the first axis, then iteratively finds maximums in the direction parallel to the subsequent axes, passing through points that maximize the previous axis. The second policy approximation, Convex Sum, is a convex combination of the maximums found independently on each axis. Unlike the Manhattan policy that works serially, the Convex Sum policy parallelizes well. Third, Axial Sum is the maximum of the Convex Sum policy approximation and nonconvex axial combinations. This policy is also parallelizable. All three policies scale linearly with the dimensions of the input $O(d_u)$.

Theorem III.4. The system (2) with value function (7), bounded drift (11), and a negative definite $\Theta$, starting at an arbitrary state $x \in X$, and on a set U (10), progresses to an equilibrium in the origin under any of the following policies:
1) Manhattan policy:

$$h_m^Q : \begin{cases} \hat{u}_1 = \underset{u_1^l \leq u \leq u_1^u}{\operatorname{argmax}} Q_{x,1}^{(0)}(u) \\ \hat{u} = \underset{u_i^l \leq u \leq u_i^u}{\operatorname{argmax}} Q_{x,n}^{(\hat{u}_{n-1})}(u), n \in [2, \ldots, d_u], \\ \hat{u}_{n-1} = \sum_{i=1}^{n-1} \hat{u}_i e_i. \end{cases} \quad (13)$$

2) Convex sum:

$$h_c^Q : \hat{u} = \sum_{i=1}^{d_u} \lambda_i e_i \underset{u_i^l \leq u \leq u_i^u}{\operatorname{argmax}} Q_{x,i}^{(0)}(u), \sum_{i=1}^{d_u} \lambda_i = 1 \quad (14)$$

3) Axial sum:

$$h_B^Q : \hat{u} = \begin{cases} h_c^Q(x), & Q(x, h_c^Q(x)) \geq Q(x, h_n^Q(x)) \\ h_n^Q(x), & \text{otherwise} \end{cases} \quad (15)$$

where $$h_n^Q(x) = \sum_{i=1}^{d_u} e_i \underset{u_i^l \leq u \leq u_i^u}{\operatorname{argmax}} Q_{x,i}^{(0)}(u)$$

A consideration in reinforcement learning, applied to robotics and other physical systems, is balancing exploitation and exportation. Exploitation ensures the safety of the system, when the policy is sufficiently good and yields no learning. Exploration forces the agent to perform suboptimal steps, and the most often used $\epsilon$-greedy policy performs a random action with probability $\epsilon$. Although the random action can lead to knowledge discovery and policy improvement, it also poses a risk to the system. The policies presented fit well in online RL paradigm, because they allow safe exploration. Given that they are not optimal, they produce new knowledge, but because of their admissibility and consistency, their input of choice is safe to the physical system In yet other aspects, the present invention provides an admissible, consistent, and efficient decision making method for learning action-value function Q locally, at fixed state x, and fixed learning iteration (when $\Theta$ is fixed) without knowing the system dynamics. Now, the decision making policies are integrated into a FVI frame-work to produce a reinforcement learning agent for continuous state and action MDPs tailored for control-affine nonlinear systems. The algorithm learns the parameterization $\Theta$, and works much like approximate value iteration to learn state-value function approximation $\theta$, but the action selection uses sampling-based policy approximation on the action-value function Q. Algorithm 1 shows an outline of the proposed continuous action fitted value iteration, CAFVI. It first initializes $\theta$ with a zero vector. Then, it iteratively estimates Q function values and uses them to make a new estimate of a $\theta$. First, we randomly select a state $x_s$ and observe its reward. Line 6 collects the samples. It uniformly samples the state space for $x_{l_s}$. Because we need three data points for Lagrangian interpolation of a quadratic function, three input samples per input dimensions are selected. We also obtain, either through a simulator or an observation, the resulting state $x'_{ij}$ when $u_{ij}$ is applied to $x_{l_s}$. Line 7 estimates the action-value function locally, for $x_{l_s}$ and $u_{1j}$ using the current $\theta_l$ value. Next, the recommended action is calculated, $\hat{u}$. Looking up the available samples or using a simulator, the system makes the transition from $x_{l_s}$ using action $\hat{u}$. The algorithm makes a new estimate of $V(x_{l_s})$. After $n_s$ states are processed, Line 12 finds new $\theta$ that minimizes the least squares error for the new state-value function estimates $v_{ls}$. The process repeats until either θ converges, or a maximum number of iterations are reached.

---

Algorithm 1 Least squares axial policy approximation (LSAPA)

Input: current state x, parametrization estimate θ
Input: basis function vector F, simulator D
Output: û
1: for i = 1, ..., $d_u$ do
2:    sample input $U_i = [u_{1,i} \ldots u_{d_\alpha,i}]^T$
3:    for j = 1, ..., $d_n$ do
4:      $x'_{j,i} \leftarrow D(x, u_{j,i})$
5:      $Q_{x,j}(u_{j,i}) \leftarrow \theta^T F(x'_{j,i})$
6:    end for
7:    $\hat{p}_i \leftarrow \arg\min_{pi} \Sigma_{j=1}^{d_n} (C_{j,i} p_i - Q_{x,j}(u_{j,i}))^2$
8:    $\hat{u}_i^* \leftarrow -\dfrac{p_{1,i}}{2p_{2,i}}$
9:    $\hat{u}_i = \min(\max(\hat{u}_i^*, u_i^l), u_i^u)$
10: end for
11: û ← calculated with (9)
12: return û

---

The novelties of the Algorithm 1 are continuous input spaces, and the joint work with both state and action-value functions (Lines 6-8), while FVI works with discrete, finite input sets and with one of the two functions, but not both. Although the outcome of the action-value function learning (Line 8) is independent of the input samples, the state-value function learning (Line 12) depends on the state-samples collected in Line 5, just like discrete action FVI.

Considering a constraint-balancing task, in other embodiments the present invention provides quadratic feature vectors, and determined sufficient conditions for which admissible policies presented in Section III-B transition the system to the goal state obeying the task requirements. In other aspects, the present invention provides a learning algorithm that learns the parametrization.

Full conditions under which FVI with discrete actions converges is still an active research topic. It is known that it converges when the system dynamics is a contraction. A detailed analysis of the error bounds for FVI algorithms with finite and continuous actions, finds that the FVI error bounds scale with the difference between the basis functional space and the inherent dynamics of the MDP. The system's dynamics and reward functions determine the MDP's dynamics. We choose quadratic basis functions, because of the nature of the problem we need to solve and for stability. But, basis functions must fit reasonably well into the true objective function (3) determined by the system dynamics and the reward, otherwise CAFVI diverges.

Using quadratic basis functions, Algorithm 1 learns the parametrization θ. Successful learning that converges to a θ with all negative components, produces a controller based on policies that is safe for a physical system and completes the task.

In all evaluations, the Convex Sum was calculated using equal convex coefficients $\lambda = d^{-1}$. Discrete and HOOT policies are used for comparison. The discrete policy uses an equidistant grid with 13 values per dimension. HOOT uses three hierarchical levels, each covering one tenth of the input size per dimension and maintaining the same number of inputs at each level. All computation was performed using Matlab on a single core Intel Core i7 system with 8 GB of RAM, running the Linux operating system.

Table III depicts maximum and minimum values for $\Delta Q(x, h^Q(x))$ as Q ranges over the class of concave elliptical paraboloids.

TABLE III

SUMMARY OF POLICY APPROXIMATION PERFORMANCE. MINIMUM AND MAXIMUM OF THE VALUE GAIN AND THE DISTANCE FROM THE OPTIMAL INPUT.

| Method | min ΔQ | max ΔQ | min Δu | max Δu |
|---|---|---|---|---|
| Manhattan | 5.00 | 168.74 | 0.00 | 4.12 |
| Axial Sum | 3.40 | 163.76 | 0.00 | 4.37 |
| Convex Sum | 3.40 | 103.42 | 0,10 | 4.37 |

Since the ΔQ is always positive for all three policies, the empirical results confirm the findings from Proposition III.4 that the policies are admissible. We also see from min Δu that in some cases Manhattan and Axial Sum make optimal choices, which is expected as well. The maximum distance from the optimal input column shows that the distance from the optimal input is bounded.

To further evaluate the policies' quality we measure the gain ratio between the policy's gain and maximum gain on the action-value function (u* is optimal input):

$$g_{h^Q}(x) = \frac{Q(x, h^Q(x)) - Q(x, 0)}{Q(x, u^*) - Q(x, 0)}.$$

Figure 6:
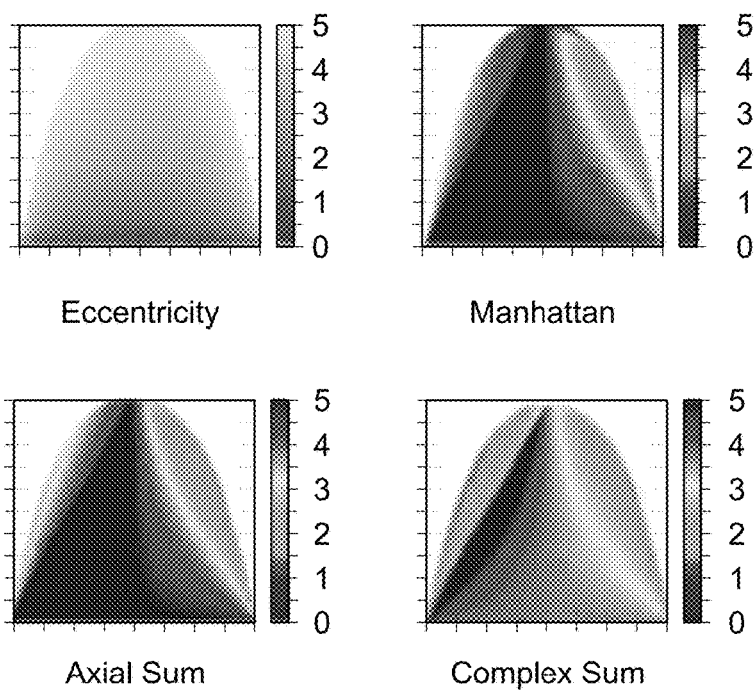
FIG. 6 illustrates eccentricity of the quadratic functions (a) related to policy approximation gain ratio (b-d) as a function of quadratic coefficient (C) and rotation of the semi-axes.

Non-admissible policies have negative or zero gain ratio for some states, while the gain ratio for admissible policies is strictly positive. The gain ratio of one signifies that policy $h^Q$ is optimal, while a gain ratio of zero means that the selected input transitions the system to an equivalent state from the value function perspective. The elliptic paraboloids', $$Q(x, [u_1, u_2]^T) = au_1^2 + bu_1u_2 + cu_2^2 + du_1 + eu_2 + f,$$

isolines are ellipses, and the approximation error depends on the rotational angle of the ellipse's axes, and its eccentricity. Thus, a policy's quality is assessed as a function of these two parameters: the rotational angle α and range of the parameter c, while parameters a, d, e, and f are fixed. Parameter b is calculated such that b=(a−c)tan 2α. The eccentricity is depicted in FIG. 6a, with zero eccentricity representing a circle, and an eccentricity of one representing the ellipse degenerating into a parabola. The white areas in the heat maps are areas where the function is either a hyperbolic paraboloid or a plane, rather than an elliptic paraboloid and has no maximum. FIG. 6 displays the heat maps of the gain ratios for the Manhattan (FIG. 6b), Axial Sum (FIG. 6c), and Convex Sum (FIG. 6d) policies. All policies have strictly positive gain ratio, which gives additional empirical evidence to support the finding in Proposition III.4. Manhattan and Axial Sum perform similarly, with the best results for near-circular paraboloids, and degrading as the eccentricity increases. In contrast, the Convex Sum policy performs best for highly elongated elliptical paraboloids.

Figure 7:
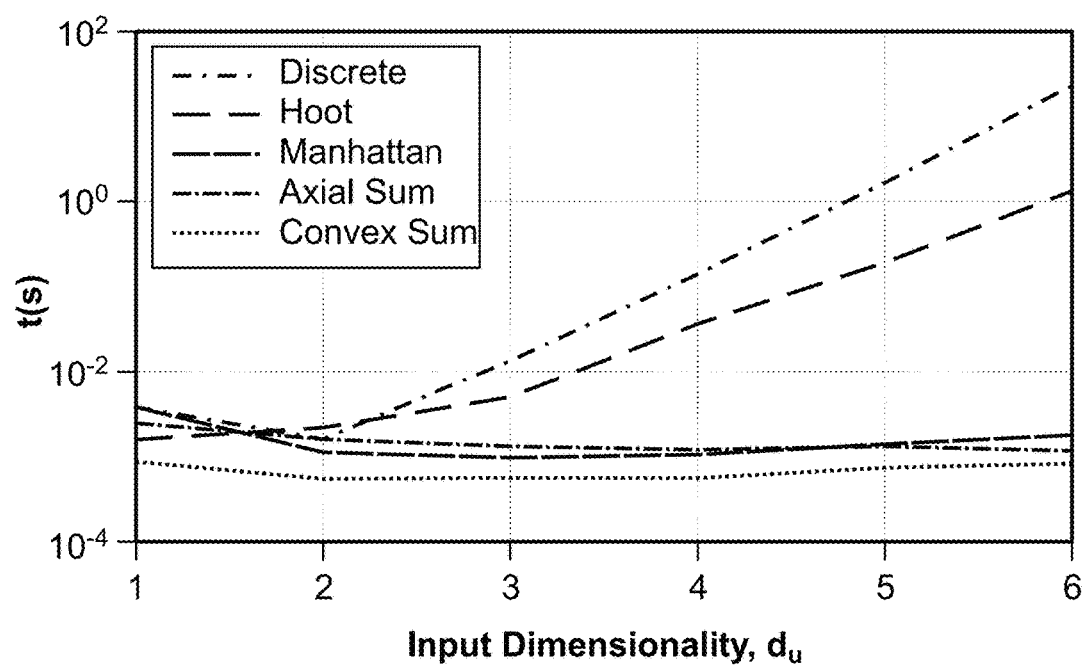
FIG. 7 illustrates policy approximation computational time per input dimensionality. Comparison of discrete, HOOT, Manhattan, Axial Sum, and Convex Sum policies. The y-axis is logarithmic.

FIG. 7 depicts the computational time for each of the policies as a function of the input dimensionality. Both discrete and HOOT policies' computational time grows exponentially with the dimensionality, while the three policies that are based on the axial maximums: Manhattan, Axial Sum, and Convex Sum are linear in the input dimensionality, although Manhattan is slightly slower.

In another embodiment, the teachings of the present invention were applied to an aerial cargo delivery task. This task is defined for a UAV carrying a suspended load, and seeks acceleration on the UAV's body, that transports the joint UAV-load system to a goal state with minimal residual oscillations. We show that the system and its MDP satisfy conditions for Theorem III.2.

To apply the motion planner to the cargo delivery task for a holonomic UAV carrying a suspended load, we use the following definition of the swing-free trajectory.

Definition A trajectory of duration $t_0$ is said to be with minimal residual oscillations if for a given constant $\epsilon > 0$ there is a time $0 \le t_1 \le t_0$, such that for all $t \ge t_1$, the load displacement is bounded with $\epsilon(\rho(t) < \epsilon)$. The MDP state space is the position of the center of the mass of the UAV $p = [xyz]^T$, its linear velocities $v = [\dot{x}\dot{y}\dot{z}]^T$, the angular position $\eta = [\psi\ \phi]^T$ of the suspended load in the polar coordinates originating at the quadrotor's center of mass, with the zenith belonging to the axis perpendicular to Earth, and its angular velocities $\dot{\eta} = [\dot{\psi}\ \dot{\phi}]^T$. The actuator is the acceleration on the quadrotor's body, $u = [u_x\ u_y\ u_z]^T$. For the system's generative model, we use a simplified model of the quadrotor-load model described in, which satisfies the form (1).

$$v = v_0 + \Delta t u;\ p = p_0 + \Delta t v_0 + \frac{\Delta t^2}{2} u \qquad (16)$$

$$\dot{\eta} = \dot{\eta}_0 + \Delta t \ddot{\eta};\ \eta = \eta_0 + \Delta t \dot{\eta}_0 + \frac{\Delta t^2}{2} \ddot{\eta},\ \text{where}$$

$$\ddot{\eta} = \begin{bmatrix} \sin\theta_0\sin\phi_0 & -\cos\phi_0 & L^{-1}\cos\theta_0\sin\phi_0 \\ -\cos\theta_0\cos\phi_0 & 0 & L^{-1}\cos\phi_0\sin\theta_0 \end{bmatrix} (u - g')$$

The system (16) satisfies the form (1). The reward function penalizes the distance from the goal state, the load displacement, and the negative z coordinate. Lastly, the agent is rewarded when it reaches equilibrium. The value function is approximated as a linear combination of quadratic forms of state subspaces $V(x) = \theta^T * F(x)$ $F(x) = [\|p\|^2\ \|v\|^2\ \|\eta\|^2\ \|\dot{\eta}\|^2]^T$ where $\theta \in R^4$, satisfies the form (7), and because the learning produces 0 with all negative components, all conditions for Theorem III.2 is satisfied including the drift (11).

Figure 8:
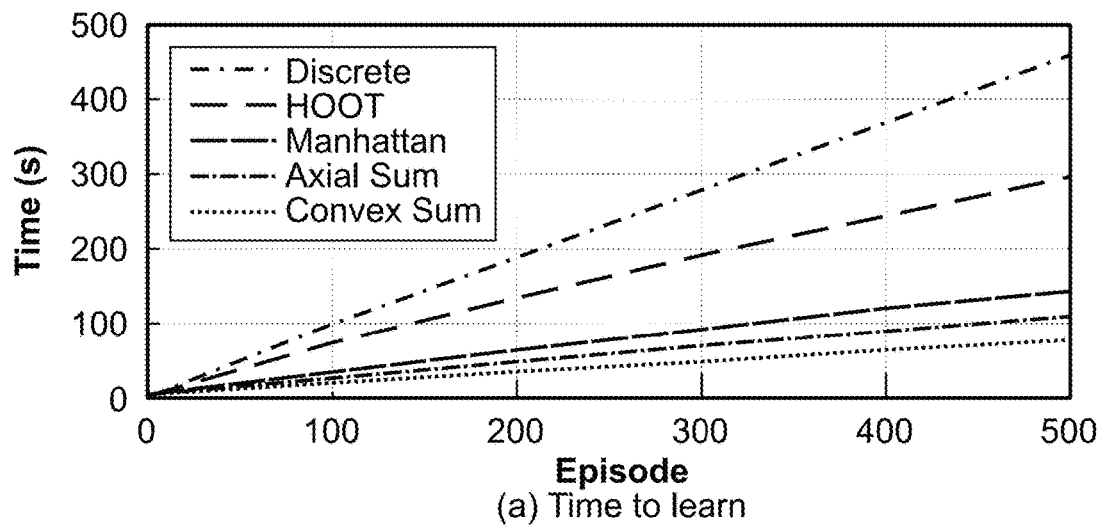
FIG. 8 illustrates learning results for Manhattan, Axial Sum, and Convex Sum, compared to discrete greedy, and HOOT policies averaged over 100 trials. Learning curves for Manhattan and Axial Sum are similar to Convex Sum and are omitted from (b) for better visibility.
Figure 8:
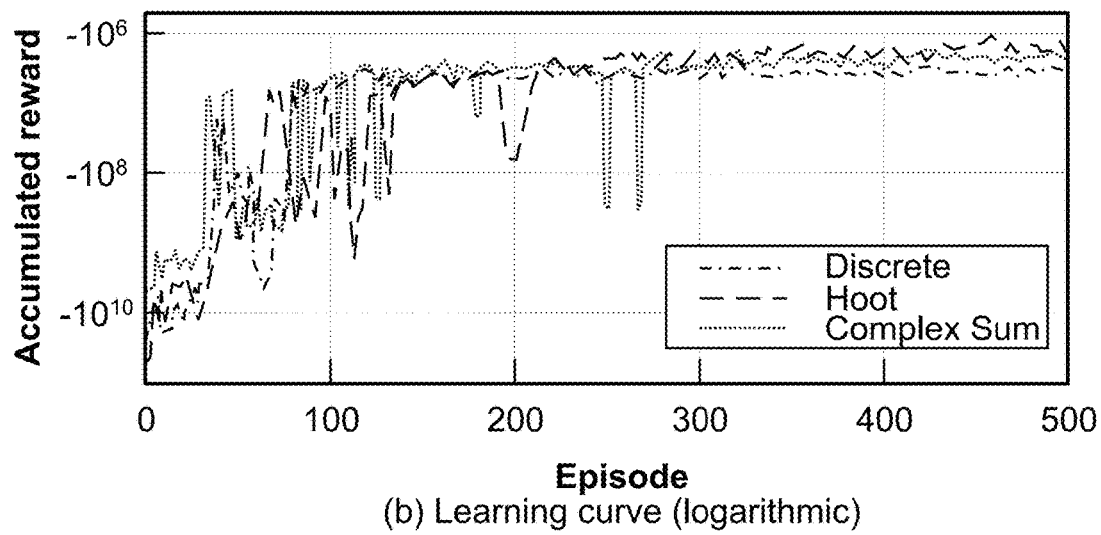

The time-to-learn is presented in FIG. 8a. The axial maximum policies perform an order of magnitude faster than the discrete and HOOT policies. To assess learning with Algorithm 1 using Manhattan, Axial Sum, and Convex Sum policies, we compare to learning using the greedy discrete policy and HOOT. FIG. 8b shows the learning curve, over number of iterations. After 300 iterations all policies converge to a stable value. All converge to the same value, but discrete learning that converges to a lower value.

Finally, inspection of the learned parametrization vectors confirms that all the components are negative, meeting all needed criteria for Theorem III.2. This means that the equilibrium is asymptotically stable, for admissible policies, and we can generate trajectories of an arbitrary length.

Next, we plan trajectories using the learned parametrizations over the 100 trials for the three proposed policies and compare them to the discrete and HOOT policies. We consider a cargo delivery task complete when $\|p\| \le 0.010$ m, $\|v\| \le 0.025$ m/s, $\|\eta\| \le 1°$, and $\|\dot{\eta}\| \le 5°/s$. This is a stricter terminal set than the one previously used in [29]. The input limits are $-3 \le u_i \le 3$, for $i \in 1, 2, 3$. The discrete and HOOT policies use the same setup as described. The planning occurs at 50 Hz. We compare the performance and trajectory characteristics of trajectories originating 3 meters from the goal state. Table IV presents results of the comparison.

TABLE IV

SUMMARY OF TRAJECTORY CHARACTERISTICS OVER 100 TRIALS, MEANS ($\mu$) AND STANDARD DEVIATIONS ($\sigma$) OF TIME TO REACH THE GOAL, FINAL DISTANCE TO GOAL, FINAL SWING, MAXIMUM SWING, AND TIME TO COMPUTE THE TRAJECTORY. BEST RESULTS ARE HIGHLIGHTED.

| Method | Percent completed | t (s) $\mu$ | $\sigma$ | $\|p\|$ (cm) $\mu$ | $\sigma$ | $\|\eta\|$ (°) $\mu$ | $\sigma$ | max $\|\eta\|$ (°) $\mu$ | $\sigma$ | Comp. time (s) $\mu$ | $\sigma$ |
|---|---|---|---|---|---|---|---|---|---|---|---|
| Discrete | 70.00 | 10.81 | 3.12 | 0.98 | 0.33 | 0.16 | 0.14 | 11.96 | 1.63 | 0.81 | 0.23 |
| HOOT | 100.00 | 8.49 | 1.33 | 0.83 | 0.27 | 0.18 | 0.20 | 12.93 | 1.49 | 0.48 | 0.07 |
| Manhattan | 100.00 | 8.66 | 1.68 | 0.89 | 0.19 | 0.15 | 0.16 | 12.24 | 3.58 | 0.24 | 0.05 |
| Axial Sum | 100.00 | 8.55 | 1.56 | 0.85 | 0.22 | 0.20 | 0.18 | 12.61 | 1.55 | 0.17 | 0.03 |
| Convex Sum | 100.00 | 9.61 | 1.62 | 0.97 | 0.07 | 0.03 | 0.06 | 9.52 | 1.29 | 0.14 | 0.02 |

Figure 9A:
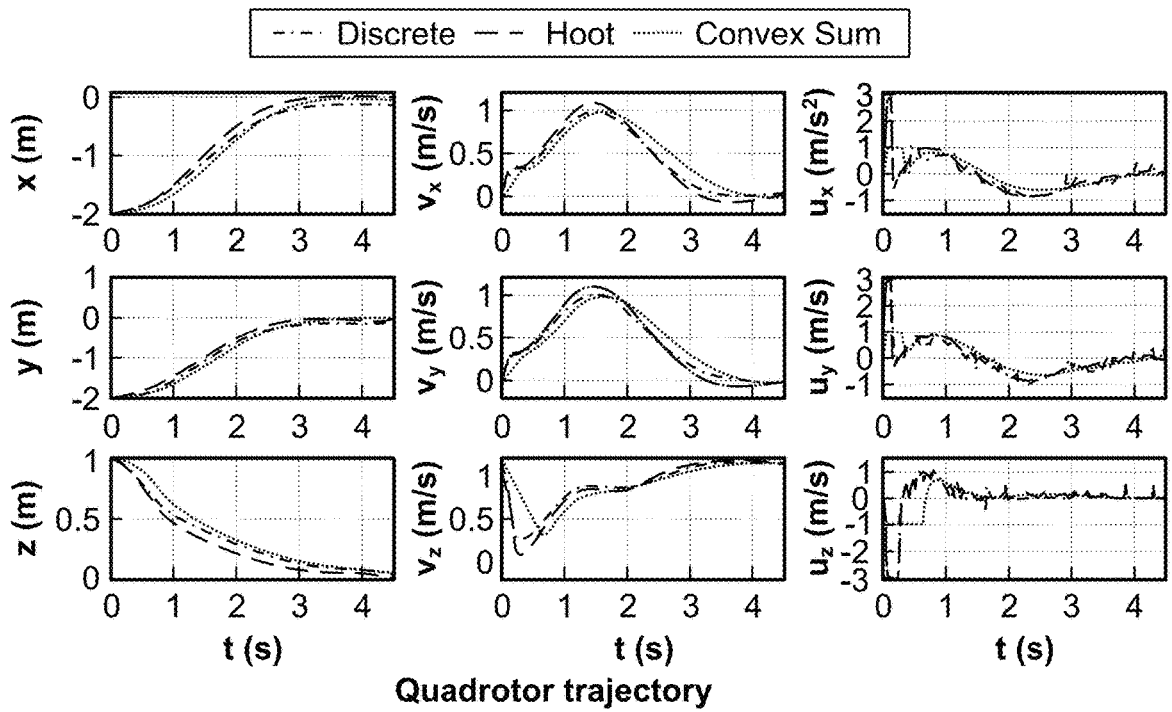
FIGS. 9A-9B illustrate a comparison of experimental cargo delivery task trajectories created with Convex Sum versus trajectories created with discrete greedy and HOOT policies. (Trajectories for Manhattan and Axial Sum are similar to Convex Sum and are omitted for better visibility.)
Figure 9B:
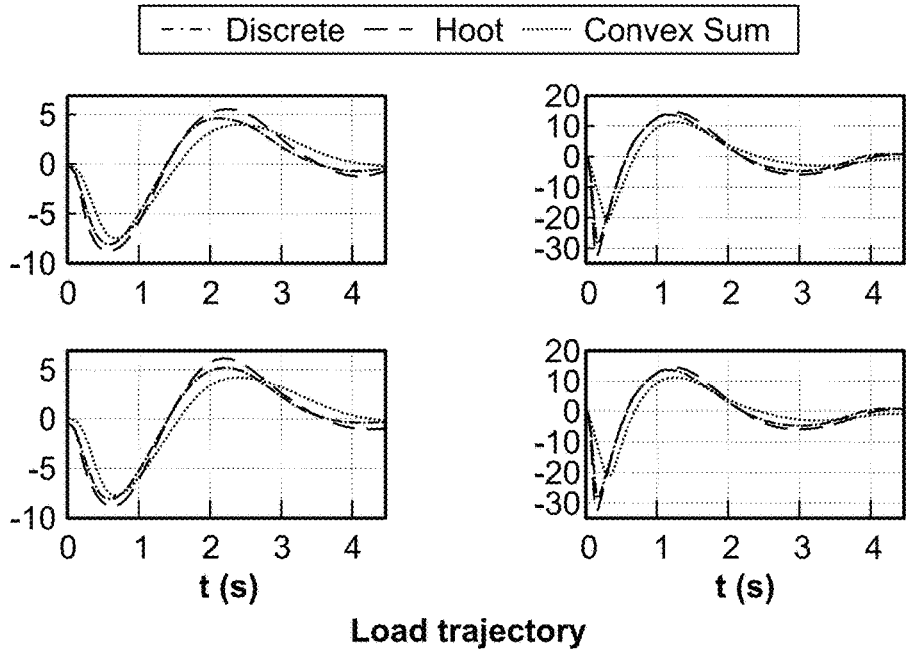

Manhattan, Axial Sum, and HOOT produce very similar trajectories, while Convex Sum generates slightly longer trajectories, but with the best load displacement characteristics. This is because the Convex Sum takes a different approach and selects smaller inputs, resulting in smoother trajectories. The Convex Sum method plans the 9-second trajectory in 0.14 s, over 5 times faster than the discrete planning, and over 3 times faster than HOOT. Finally, 30% of the discrete trajectories are never able to complete the task. This is because the terminal set is too small for the discretization. In other words, the discretized policy is not admissible. Examining the simulated trajectories in FIG. 9 reveals that Convex Sum indeed selects a smaller input, resulting in a smoother trajectory (FIG. 9A) and less swing (FIG. 9B). HOOT, Manhattan, and Axial Sum, produce virtually identical trajectories, while the discrete trajectory has considerable jerk, absent from the other trajectories.

Figure 10:
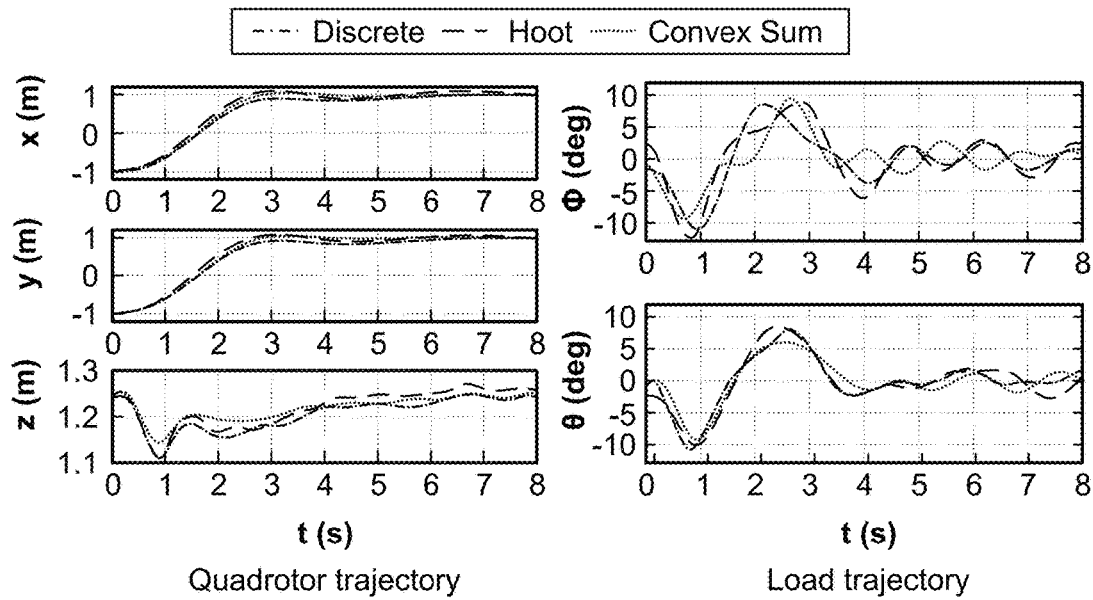
FIG. 10 illustrates a comparison of experimental cargo delivery task trajectories created with Convex Sum versus trajectories created with discrete greedy and HOOT policies. (Trajectories for Manhattan and Axial Sum are similar to Convex Sum and are omitted for better visibility.)

The learned policies were also experimentally compare. The experiments were performed on AscTec Humming-bird quadcopters, carrying a 62-centimeter suspended load weighing 45 grams. The quadrotor and load position were tracked via a Vicon motion capture system at 100 Hz. Experimentally, HOOT and Axial Sum resulted in similar trajectories, while Manhattan's trajectory exhibited the most deviation from the planned trajectory (FIG. 10). The Convex Sum trajectory is the smoothest. Table V quantifies the maximum load swing and the power required to produce the load's motion from the experimental data.

TABLE V

SUMMARY OF EXPERIMENTAL TRAJECTORY CHARACTERISTICS. MAXIMUM SWING AND ENERGY NEEDED TO PRODUCE LOAD OSCILLATIONS. BEST RESULTS ARE HIGHLIGHTED.

| Method | max $\|\eta\|$ (°) | Energy (J) |
| --- | --- | --- |
| Discrete | 15.21 | 0.0070 |
| HOOT | 15.61 | 0.0087 |
| Manhattan | 15.95 | 0.0105 |
| Axial Sum | 14.20 | 0.0086 |
| Convex Sum | 12.36 | 0.0031 |

Convex Sum policy generates experimental trajectories with the best load swing performance, and with load motion that requires close to three times less energy to generate. The enclosed video submission contains videos of the experiments.

The rendezvous cargo delivery task is a multi-agent variant of the time-sensitive cargo delivery task. It requires an UAV carrying a suspended load to rendezvous in swing-free fashion with a ground-bound robot to hand over the cargo. The cargo might be a patient airlifted to a hospital and then taken by a moving ground robot for delivery to an operating room for surgery. The rendezvous location and time are not known a priori, and the two heterogeneous agents must plan jointly to coordinate their speeds and positions. The two robots have no knowledge of the dynamics and each other's constraints. The task requires minimization of the distance between the load's and the ground robot's location, the load swing minimization, and minimization for the agents' velocities, while completing the task as fast as possible.

The quadrotor with the suspended load is modeled as was described, while a rigid body constrained to two DOF in a plane models the ground-based robot. The joint state space is a 16-dimensional vector: the quadrotor's 10-dimensional state space and the ground robot's position velocity space. The input is 5-dimensional acceleration to the quadrotor's and ground robot's center of masses. The ground robot's maximum acceleration is lower than quadrotor's.

Figure 11:
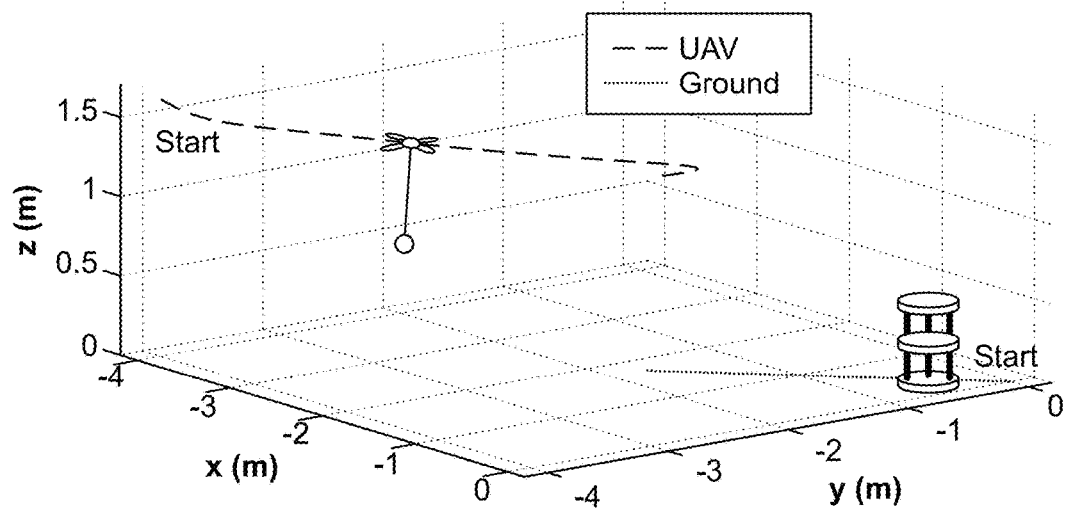
FIG. 11 illustrates cargo-bearing UAV and a ground-based robot rendezvous two seconds.
Figure 12A:
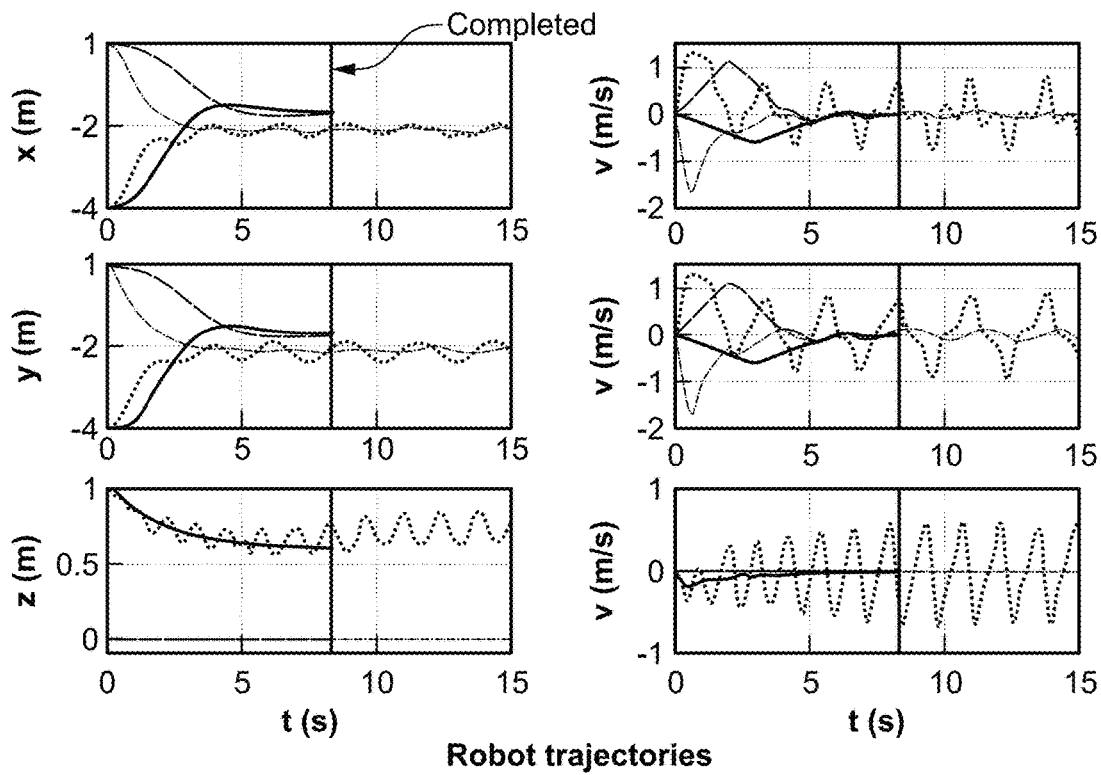
FIGS. 12A-12C are comparisons of simulated rendezvous task trajectories created with Convex Sum to trajectories created with discrete greedy and HOOT policies.
Figure 12B:
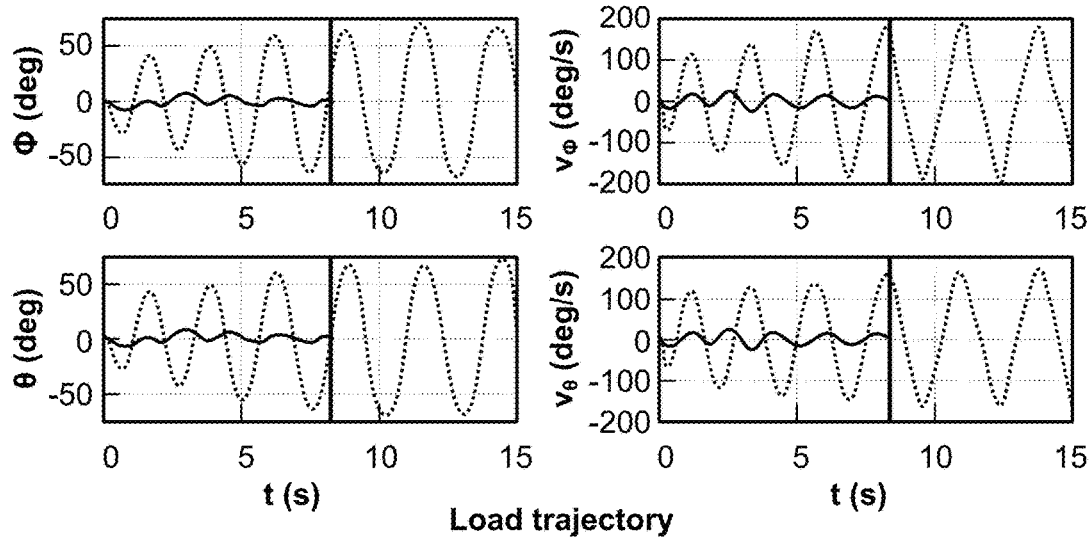
Figure 12C:
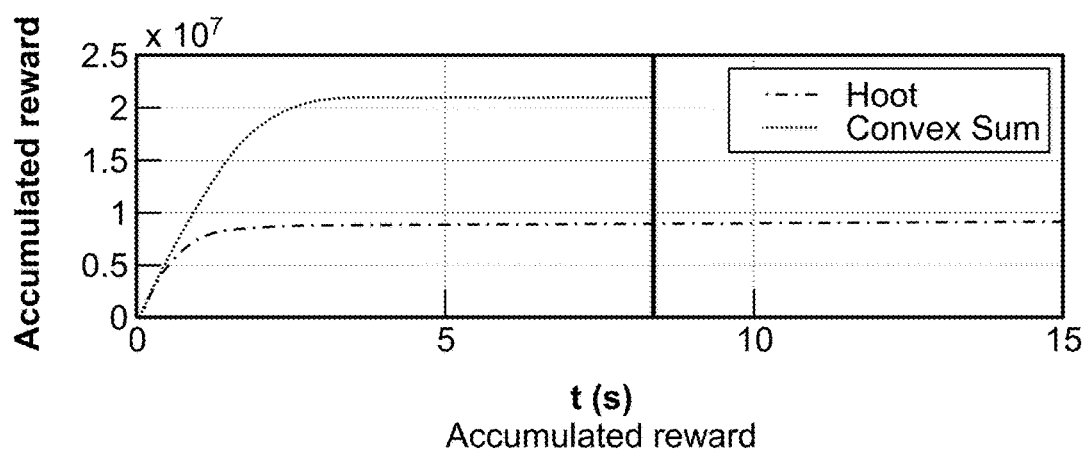

Applying Algorithm 1 with Convex Sum policy, the system learns the state-value function parametrization Θ that is negative definite. FIG. 11 shows both robots two seconds in the trajectory. The comparison of simulated trajectories created with the Convex Sum and HOOT policies is depicted in FIG. 12. Convex Sum finds an 8.54-second trajectory that solves the task in 0.12 seconds. HOOT policy fails to find a suitable trajectory before reaching the maximum trajectory duration, destabilizes the system, and terminates after 101.44 seconds. The discrete policy yields similar results as HOOT. This is because the input needed to solve the task is smaller than the HOOT's setup, and the system begins to oscillate. The rendezvous point produced with Convex Sum policy is between the robots' initial positions, closer to the slower robot, as expected (FIG. 12A). The quadrotor's load swing is minimal (FIG. 12B). The absolute accumulated reward collected while performing the task is smooth and steadily making progress, while the accumulated reward along HOOT trajectory remains significantly lower (FIG. 12C).

In yet other embodiments, the present invention provides a vehicle that has a frame having one or more opposingly located propulsion units. The propulsion units have one or more microprocessors, speed controllers, and at least two motors that drive propellers. An electrical distribution network such as a network bus or one or more switched interconnected the electrical components.

The microprocessors monitor the operational state of the propulsion units and control the electrical interconnections. The microprocessors, which may be arranged in a master/slave arrangement may include self-diagnostic capabilities and be trained for component failure and corresponding change in flight characteristics. In addition, the microprocessors may also be trained to maximize operational efficiency of a vehicle by alternating the use of the power sources that supply each motor to minimize temperature and maximize efficiency.

The speed controllers may be coupled to the power sources and control the operation of the motors. The speed controllers may be configured to have three-phase output and the inputs may be a control signal received from one of the microprocessors and a sensed power level. The VTOL vehicle of claim 1, wherein in the event of a failure of one of said speed controllers, the motor assigned to the failed speed controller is operated by one of the remaining speed controllers.

In other embodiments, the vehicles of the present invention, which include one or more moving vehicles, are adapted, in the event of a failure of a power source assigned to a motor, to use one of the remaining power sources to power a motor. To limit the computing power needed for a central controller, the propulsion units are configured to perform decision-making based on internal monitoring of voltages, currents and power temperatures. In addition, the propulsion units may be adapted to autonomously select the power source coupled to a motor, to isolate a faulty power source; and under normal conditions, to switch between power sources coupled to a motor to minimize heat dissipation and maximize efficiency. Furthermore, a propulsion unit may be adapted to autonomously control the distribution of power between motors, and in the event one motor fails, it supplies power to another motor.

In other embodiments, the present invention provides artificial intelligent methodologies, such as described above, that have applications to any type of moving vehicle, as well as other systems in which intelligent control is needed. In one embodiment, the present invention provides a control unit that is adapted to constantly monitor and report unusual component behavior before failure occurs. In other embodiments, a second artificial intelligent control unit is used wherein the artificial intelligent control units are arranged in a master/slave relationship. The artificial intelligent control units may also be adapted to produce control signals, such as motor control signals, for the propulsion units, that take into account the current state-of-health of the vehicle or system by being trained under normal operating conditions to build a model that takes the measurements of actual performance data and compares the data to expected data from a model. The artificial intelligent control units may also be configured to recognize a disruption from normal operation, such as flight operation, and perform decision making to the control the operation of the system, and depending on the disturbance pattern, the artificial intelligent control unit is adapted to perform an emergency procedure and/or control the operation of the system. In still further embodiments, the artificial intelligent control units are trained using reinforcement learning, which may include continuous action fitted value iteration as described above.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiments, methods, and examples, but by all embodiments and methods within the scope and spirit of the disclosure.

What is claimed is:

1. A vertical take-off and landing (VTOL) vehicle, comprising:
   a frame having a plurality of opposingly located propulsion units attached thereto;
   each of said propulsion units comprising a plurality of microprocessors, a plurality of speed controllers, two motors that drive propellers, and a plurality of power sources that are electrically interconnected by at least one switch;
   said microprocessors monitor the operational state of said propulsion units and control said electrical interconnections; and
   each of said speed controllers coupled to one of said power sources and control the operation of said motors.

2. The VTOL vehicle of claim 1, wherein said speed controllers have a three-phase output and inputs comprising a control signal received from one of said microprocessors and a sensed power level.

3. The VTOL vehicle of claim 1, wherein said microprocessors include self-diagnostic capabilities.

4. The VTOL vehicle of claim 1, wherein said microprocessors are trained for component failure and corresponding change in flight characteristics.

5. The VTOL vehicle of claim 1, wherein said microprocessors are trained to maximize operational efficiency of said vehicle.

6. The VTOL vehicle of claim 1, wherein said microprocessors are trained to maximize operational efficiency of said vehicle by alternating the use of the power sources that supply each motor to minimize temperature and maximize efficiency.

7. The VTOL vehicle of claim 1, wherein in the event of a failure of one of said speed controllers, the motor assigned to the failed speed controller is operated by one of the remaining speed controllers.

8. The VTOL vehicle of claim 1, wherein in the event of a failure of a power source assigned to a motor, one of said remaining power sources is used to power said motor.

9. The VTOL vehicle of claim 1, wherein two microprocessors are provided and are arranged in a master/slave relationship.

10. The VTOL vehicle of claim 1, wherein each propulsion unit performs decision-making based on internal monitoring of voltages, currents and power temperatures.

11. The VTOL vehicle of claim 1, wherein each propulsion unit is adapted to autonomously select the power source coupled to a motor;
    to isolate a faulty power source; and
    under normal conditions, to switch between power sources coupled to a motor to minimize heat dissipation and maximize efficiency.

12. The VTOL vehicle of claim 1, wherein each propulsion unit is adapted to autonomously control the distribution of power between said motors, and in the event one motor fails, it supplies power to another motor.

13. The VTOL vehicle of claim 1, further including at least one artificial intelligent control unit and wherein each propulsion unit is adapted to constantly monitor and to report unusual component behavior before failure occurs to said at least one artificial intelligent control unit.

14. The VTOL vehicle of claim 13, further including a second artificial intelligent control unit and wherein said artificial intelligent control units are arranged in a master/slave relationship.

15. The VTOL vehicle of claim 14, wherein said artificial intelligent control units are adapted to produce motor controls for said propulsion units that take into account the current state-of-health of the vehicle.

16. The VTOL vehicle of claim 15, wherein said artificial intelligent control units are adapted to produce motor controls for said propulsion units that take into account the current state-of-health of the vehicle by being trained under normal flying conditions to build a model that takes the measurements of actual flight data performance and compares said data to expected data from said model.

17. The VTOL vehicle of claim 16, wherein when one of said artificial intelligent control units recognize a disruption from normal flight, said artificial intelligent control unit performs decision making to alter flight control, and depending on the disturbance pattern, said artificial intelligent control unit is adapted to perform an emergency landing or load balance said propulsion units and resume normal flight.

18. The VTOL vehicle of claim 16, wherein said artificial intelligent control units are trained using reinforcement learning.

19. The VTOL vehicle of claim 18, wherein said reinforcement learning comprises continuous action fitted value iteration.

20. The VTOL vehicle of claim 19, wherein said continuous action fitted value iteration uses an algorithm comprising:

```
Input: current state x, parametrization estimate θ
Input: basis function vector F, simulator D
Output: û
 1:  for i = 1, ..., d_u do
 2:      sample input U_i = [u_{1,i} ... u_{d_α,i}]^T
 3:      for j = 1, ..., d_n do
 4:          x'_{j,i} ← D(x, u_{j,i})
 5:          Q_{x,j}(u_{j,i}) ← θ^T F(x'_{j,i})
 6:      end for
 7:      p̂_i ← argmin_{p_i} Σ_{j=1}^{d_n} (C_{j,i} p_i − Q_{x,j}(u_{j,i}))^2
 8:      û_i* ← − p_{1,i} / (2 p_{2,i})
 9:      û_i = min(max(û_i*, u_i^l), u_i^u)
10:  end for
11:  û ← calculated with (9)
12:  return û.
```

* * * * *